UNITED STATES PATENT OFFICE.

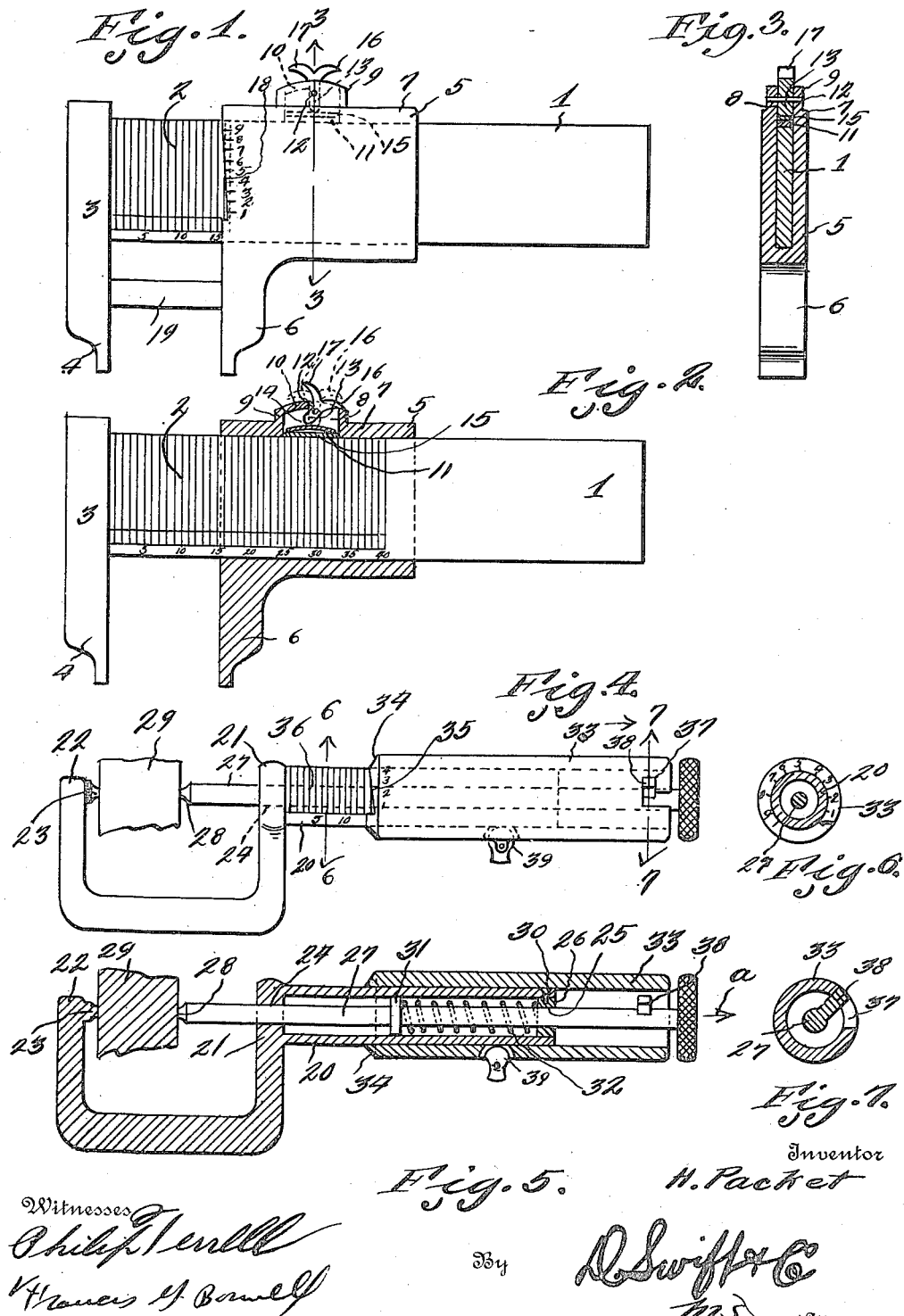

HENRY PACKET, OF PASSAIC, NEW JERSEY.

CALIPERS OR MEASURING INSTRUMENT.

1,231,934.  Specification of Letters Patent.  Patented July 3, 1917.

Application filed July 21, 1916. Serial No. 110,549.

*To all whom it may concern:*

Be it known that I, HENRY PACKET, a citizen of the Republic of France, residing at Passaic, in the county of Passaic, State of New Jersey, have invented a new and useful Calipers or Measuring Instrument; and I do hereby declare the following to be a full, clear, and exact description of the invention, such as will enable others skilled in the art to which it appertains to make and use the same.

This invention relates to the art of measuring instruments and particularly an improved caliper, more especially designed for use in machine work, or any other work where measurements are made using infinitesimal parts or fractions of graduations.

One of the objects of the invention is to provide the measuring instrument of this kind comprising improved, efficient and practical features of construction.

Another object of the invention is to provide a graduated blade, a slide thereon having an oblique edge of an angle or pitch equal to the space between any two graduations of said blade, said oblique edge being divided or graduated correspondingly to the number of graduations to the inch, provided with the metric system on said blade, whereby measurements may be made using small fractions of an inch.

Another object of the invention is the provision of an improved locking device, to hold the slides in different adjusted positions.

Another object of the invention is to provide an instrument of this kind having means, whereby the thickness or the width may be attained, the measurement being indicated on the blade of the instrument, and after which said means may be moved, whereby the member being measured may be removed from the instrument, and the measurement subsequently read.

In practical fields, the details of construction may necessitate alterations falling within the scope of what is claimed.

The invention comprises further features and combination of parts, as hereinafter set forth, shown in the drawings and claimed.

In the drawings:—

Figure 1 is a view in side elevation of the measuring instrument, constructed in accordance with the invention.

Fig. 2 is a longitudinal sectional view of the instrument.

Fig. 3 is a cross sectional view on line 3—3 of Fig. 1.

Fig 4 is a view in side elevation of a modified construction of measuring instrument.

Fig. 5 is a longitudinal sectional view through the instrument shown in Fig. 4.

Fig. 6 is a sectional view on line 6—6 of Fig. 4.

Fig. 7 is a sectional view on line 7—7 of Fig. 4.

Referring more especially to the drawings 1 designates the blade of the measuring instrument or caliper shown in Fig. 1 and is provided with graduations of inches, each inch is graduated into ten equal parts, said graduations are designated by the numeral 2. The blade 1 at one end is provided with a head 3 having a projecting part 4. A slide 5 rectangular in cross section is mounted upon the blade 1 and is provided with a lateral projection 6, between which and the projection 4 any suitable article or member may be placed, for measuring or determining the thickness or width of the same. The wall 7 of the slide 5 has an opening 8 provided with a surrounding flange 9 and an overhanging part 10. Arranged in the opening 8 is a clamping plate 11 and pivoted upon a pin 12 mounted in the sides of the flange 9 is a dog 13. Interposed between the nose 14 of the dog and the clamping plate 11 is a bowed leaf spring 15. The dog is provided with a pair of oppositely extending arms 16 and 17. It is to be noted that when the dog is disposed as shown in Fig. 1, its nose presses upon the leaf spring 15, in such wise as to hold the clamping plate 11 frictionally against one edge of the blade 1, thereby holding the slide in its adjusted position. However, should the dog be tilted upon its pivot, to the full line position in Fig. 2, the engagement of the nose with the spring is so lessened, as to relieve the tension upon the spring and allow it to relax, thereby relieving the friction between the plate 11 and the edge of the blade 1, whereby the slide 5 may be adjusted. The forward edge of one of the sides of the slide is provided with an inclined portion 18, which is of a length and so inclined as to form at its terminus a shoulder equal in width to each fractional part of each inch of the graduations on the blade 1. This inclined edge portion 18 is provided with graduations numbering from 1 to 10 inclusive, so that should the inclined edge intersect one of the lines forming the graduations on the blade 1, and an article or member 19 placed between the two parts 4 and 6 as in Fig. 1, said part or member 19 would measure one inch and fifty-five hundredths of an inch, owing to the inclined edge intersecting one of the lines of the graduations on the blade 1 at five-tenths of each tenth on the blade 1.

In Figs. 4 and 5 a tubular shank 20 corresponding to the blade 1 in Figs. 1 and 2 is provided. This tubular shank 20 at one end terminates in a U-shaped part comprising the oppositely disposed members 21 and 22. The member 22 has an abutment lug 23. Mounted in a guide 24 of the member 21 and in a guide opening 25 of the collar 26 is a rod 27, between the abutment end 28 of which, and the abutment lug 23 an article or piece to be measured (which piece is designated by the numeral 29) is designed to be arranged. The collar 26 is secured in one end of the tubular shank 20 by the screw 30. A collar 31 is carried on the rod 27 in any suitable manner, and between the collar 31 and the collar 26 a coil spring 32 is interposed. A tube 33 is fitted telescopically upon the tubular shank 20, and one end of this tube 33 is beveled as shown at 34, which beveled portion has an adjoining inclined part, which, in end elevation as in Fig. 6, extends annularly. This inclined edge 35 is of such length and so inclined as to correspond to the distance between any two graduations 36 (which are similar to those in Figs. 1 and 2), so that should the inclined edge 35 intersect one of the lines of the graduations 36 as in Fig. 4, the member or part 29 will measure one inch and thirty-five hundredths of an inch. The other end of the tube 33 is provided with a bayonet slot 37, which is engaged by the lug 28 of the rod 27, that is, when measuring an article. For instance when measuring with the caliper in Figs. 4 and 5, the rod 27 is so rocked as to permit the lug 38 to enter the bayonet slot 37, and when the cam catch is released the tube 33 and rod 27 will move together, in which case the article to be measured may be inserted between the abutment end 28 and the abutment lug 23, in which case the sleeve or tube 33 will indicate the measurement of the article, by the coöperation of the inclined edge 35, its graduations and the graduations 36. After so measuring the article 29, the cam catch is manipulated so as to engage the shank 20 frictionally sufficiently to hold the sleeve 33 in position, then the rod 27 may be rotated in the reverse direction, disengaging the lug 38 from the bayonet slot 37, after which the rod may be moved in the direction of the arrow a to permit the member 29 to be removed. Subsequently the measurement of the article may be easily read.

The invention having been set forth, what is claimed as new and useful is:—

1. A measuring instrument, comprising a U-shaped head, one arm of which having a tubular body provided with a plurality of graduations and having guides adjacent both ends, a rod mounted in said guides and having one end coöperating with the other arm of the head to engage and clamp an article to be measured between said end and said other arm, a collar on the rod, a spring between the collar and one of the guides to hold the rod in engagement with the article to be measured, a slide on the tubular body having one end provided with an inclined edge of a pitch equal with the distance between any two graduations of the body, and provided with graduations to coöperate with those of the body whereby the measurement of the article may be attained, means for detachably connecting the rod to the slide, and means for holding the slide in adjusted positions on the body.

2. A measuring instrument, comprising a U-shaped head, one arm of which having a tubular body provided with a plurality of graduations and having guides adjacent both ends, a rod mounted in said guides and having one end coöperating with the other arm of the head to engage and clamp an article to be measured between said end and said other arm, a collar on the rod, a spring between the collar and one of the guides to hold the rod in engagement with the article to be measured, a slide on the tubular body having one end provided with an inclined edge of a pitch equal with the distance between any two graduations of the body, and provided with graduations to coöperate with those of the body whereby the measurement of the article may be attained, said slide having an L-shaped slot, a lug on the rod to engage said slot, to detachably connect the rod to the slide, said slide having an opening in its wall and provided with adjoining lugs, and a member pivoted between the last named lugs to frictionally contact with the body to hold the slide in adjusted positions.

In testimony whereof I have signed my name to this specification in the presence of two subscribing witnesses.

HENRY PACKET.

Witnesses:
LOUIS WALLISCH,
CHAS. ZUCK.